United States Patent
Kadkhodayan et al.

Patent Number: 6,132,513
Date of Patent: Oct. 17, 2000

[54] PROCESS CHEMISTRY RESISTANT MANOMETER

[75] Inventors: Babak Kadkhodayan, Oakland; Andreas Fischer, Fremont; Tienyu T. Sheng, Saratoga; Gregory A. Tomasch, San Jose, all of Calif.

[73] Assignee: Lam Research Corporation, Fremont, Calif.

[21] Appl. No.: 09/283,134

[22] Filed: Mar. 31, 1999

[51] Int. Cl.[7] .............. C23C 16/00; H05H 1/00; G01L 19/00

[52] U.S. Cl. .............. 118/715; 156/345; 73/715

[58] Field of Search ................... 118/715, 504; 73/715, 724, 19.05, 700; 156/345

[56] References Cited

U.S. PATENT DOCUMENTS

| | | | |
|---|---|---|---|
| 4,657,617 | 4/1987 | Johnson et al. | 156/345 |
| 5,712,428 | 1/1998 | Schleiferböck | 73/724 |
| 5,763,769 | 6/1998 | Kluzner | 73/724 |

*Primary Examiner*—Shrive Beck
*Assistant Examiner*—Parviz Hassanzadeh
*Attorney, Agent, or Firm*—Beyer, Weaver & Thomas, LLP

[57] ABSTRACT

A manometer resistant to chemical change caused by process chemistry used in a plasma processing chamber is provided. The manometer includes a pressure sensitive diaphragm attached to a housing wherein at least a portion of the pressure sensitive diaphragm is rendered resistant to chemical change caused by process chemistry.

18 Claims, 3 Drawing Sheets

PROCESS CHEMISTRY RESISTANT MANOMETER

FIELD OF THE INVENTION

The present invention relates to the fabrication of semiconductor-based devices. More particularly, the present invention relates to manometers used in fabricating semiconductor-based devices.

BACKGROUND OF THE INVENTION

In the fabrication of semiconductor-based devices, e.g., integrated circuits or flat panel displays, layers of materials may alternately be deposited onto and etched from a substrate surface. As is well known in the art, the etching of the deposited layers may be accomplished by a variety of techniques, including plasma-enhanced etching. In plasma-enhanced etching, the actual etching typically takes place inside a plasma processing chamber. To form the desired pattern on the substrate surface, an appropriate mask (e.g., photoresist) is typically provided. A plasma is then formed from a suitable etchant source gas, or mixture of gases, to etch areas that are unprotected by the mask, leaving behind the desired pattern.

To facilitate discussion, FIG. 1A depicts a simplified plasma processing apparatus 100 suitable for fabrication of semiconductor based devices. Plasma processing apparatus 100 includes a plasma processing chamber 102 in which process parameters are tightly controlled to maintain consistent etch results. Process parameters governing etch chemistry may include plasma composition, plasma excitation, power supplied to the plasma, gas flow, plasma chamber temperature, and plasma chamber pressure. Since the etch tolerance (and resulting semiconductor-based device performance) is highly sensitive to such process parameters, accurate and repeatable control of the process parameters is required.

One or more manometers are conventionally used in order to facilitate pressure control within plasma pressure chamber 102. For example, the plasma processing apparatus 100 may include a manometer tree 104. The manometer tree 104 includes two manometers 106 and 108 which are responsible for sensing pressure within plasma processing chamber 102. Typically, the manometers 106 and 108 operate in different ranges. While one manometer may have a broad range of operation and low resolution, the second manometer generally has a smaller range of operation and higher resolution sensitivity based on the process conditions typically encountered in the plasma processing chamber 102. The manometers 106 and 108 electrically communicate with a computer 110 to facilitate monitoring and control. The computer 110 also couples with a monitor 112 to provide a suitable user interface.

In recent years, continuing miniaturization of modem semiconductor devices to critical dimensions below 0.25 microns has necessitated substantially lower process pressures of some etch processes and thus finer pressure control within the plasma pressure chamber 102. Currently, etch processes must often be repeatedly performed within a tolerance on the order of one tenth of a milliTorr (mTorr). As operating pressure outside this range may compromise performance of the semiconductor-based device, accurate and repeatable control of the plasma chamber 102 pressure within this tolerance is required.

FIG. 1B illustrates a conventional manometer 120 which may represent either manometer 106 or 108 of manometer tree 104. Manometer 120 is in gaseous communication with the plasma processing chamber 102. Manometer 120 is coupled either directly or indirectly to the plasma processing chamber 102. Inlet area 122 may either represent the plasma processing chamber 102 or, in the case of indirect coupling, may represent a portion of the manometer tree 104 which is in gaseous communication with the plasma processing chamber 102. An ambient area 123 lies within the manometer 120 and operates at similar environmental conditions as inlet area 122.

A pressure sensitive diaphragm 124 is provided within the manometer 120. The pressure sensitive diaphragm 124 allows sensing of the pressure within plasma processing chamber 102. The pressure sensitive diaphragm 124 is flexible in the direction shown by arrow A in FIG. 1B and thus allows passive response to pressure variation within ambient area 123. Commonly, the pressure sensitive diaphragm 124 acts in conjunction with rigid plate 130 to form a pair of corresponding capacitive plates. Optionally, a capacitive material may be disposed between the two plates in a sealed area 128. Thus, a capacitor is formed from the pressure sensitive diaphragm 124 and the rigid plate 130 whose capacitance is dependent on the extent of flexing of the pressure sensitive diaphragm 124. The capacitor within manometer 120 allows sensing of the pressure within the ambient area 123 as well as outputting an electrical output corresponding to the measured pressure. As shown in FIG. 1A, an electrical communication link 114 from the manometers 106 and 108 typically leads to a monitor 112 or computer 110 for user interface and control purposes.

It has been observed, however, that the performance of conventional high-resolution manometers tends to operationally degrade significantly over the operational lifetime of the manometers. For example, manometers responsible for pressure detection in the range of 0–20 mTorr range have been found to significantly degrade, particularly during early implementation of the manometer. One such degradation is referred to as "drift". Drift may be loosely described as a consistent difference between manometer output and the actual pressure in the ambient area 123. For example, unacceptable zero point drift, or non-zero readings of the manometer 120 for zero pressure in the plasma processing chamber 102, can commonly occur. As a result of this transient and permanent drift, operating pressures within plasma processing chamber 102 frequently exist outside allowable tolerances over the service life of the manometer. This seriously compromises fabrication of semiconductor-based devices.

In view of the foregoing, an improved manometer suitable for use in a plasma processing environment is required.

SUMMARY OF THE INVENTION

Broadly speaking, the invention relates to a manometer that is resistant, during operation, to change caused by process chemistry used in a plasma processing chamber of a substrate manufacturing apparatus. According to the invention, accurate and reliable pressure measurements with respect to the plasma processing chamber can be obtained from the manometer without being hampered by drift problems.

The invention relates in accordance with one embodiment to a manometer for use in a plasma processing chamber. The manometer includes a housing in gaseous communication with the plasma processing chamber and a rigid plate attached to the housing. The manometer also includes a pressure sensitive diaphragm attached to the housing, the pressure sensitive diaphragm sealing a portion of the housing in which the rigid plate is isolated from gaseous communication with the plasma processing chamber, wherein at least a portion of the pressure sensitive diaphragm is resistant to a change caused by etch chemistry used in the plasma processing chamber over the operational life of the manometer.

The invention relates in accordance with another embodiment to a semiconductor fabrication apparatus. The semiconductor fabrication apparatus includes a plasma processing chamber capable of administering a semiconductor fabrication process; and at least one manometer coupled to the plasma processing chamber including a pressure sensor resistant to a change caused by process chemistry used within the plasma processing chamber over the operational life of the manometer.

The invention relates in accordance with another embodiment to a method of protecting a diaphragm in a manometer for use conjunction with in a plasma processing chamber. The method includes, before use in a plasma processing chamber, repeatedly exposing at least one surface of the diaphragm to at least one chemical species capable of passivating the diaphragm surface until the surface becomes resistant to further change from a chemical species used in a plasma processing chamber process.

The invention relates in accordance with yet another embodiment to a method of protecting a diaphragm in a manometer for use in conjunction with a plasma processing chamber. The method includes rendering at least one surface of the diaphragm resistant to at least one chemical species included in a plasma processing chamber process during normal operation.

BRIEF DESCRIPTION OF THE DRAWINGS

The present invention is illustrated by way of example, and not by way of limitation, in the figures of the accompanying drawings in which like reference numerals refer to similar elements, and in which.

DETAILED DESCRIPTION OF THE INVENTION

Figure 1A:
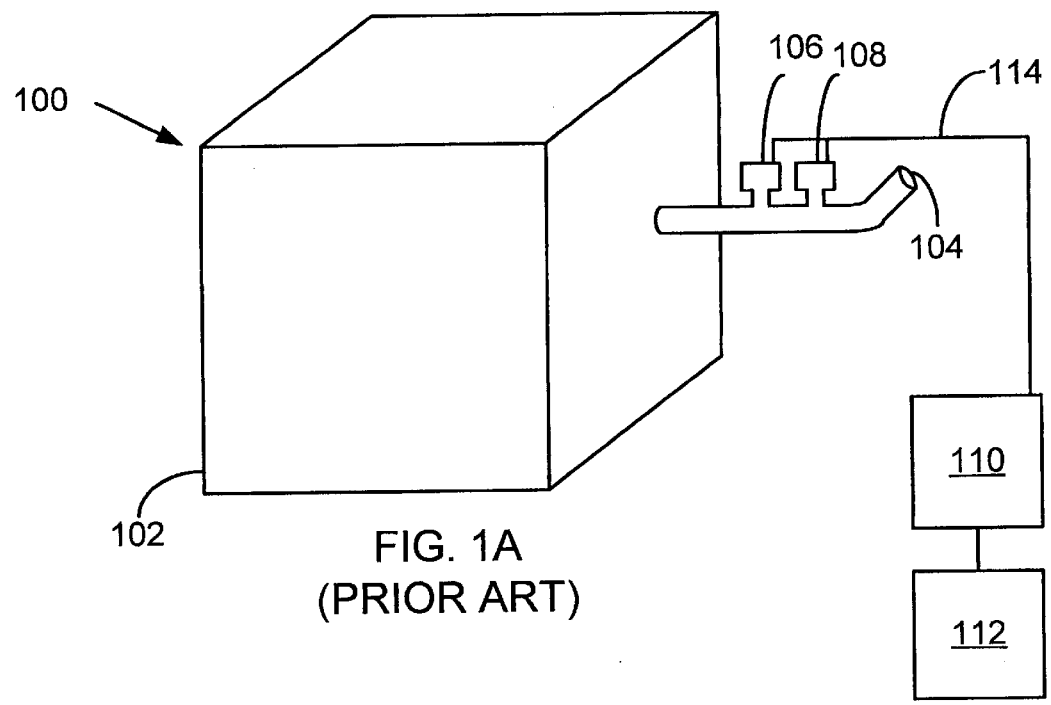
FIG. 1A depicts a simplified conventional plasma processing apparatus suitable for fabrication of semiconductor-based devices.
Figure 1B:
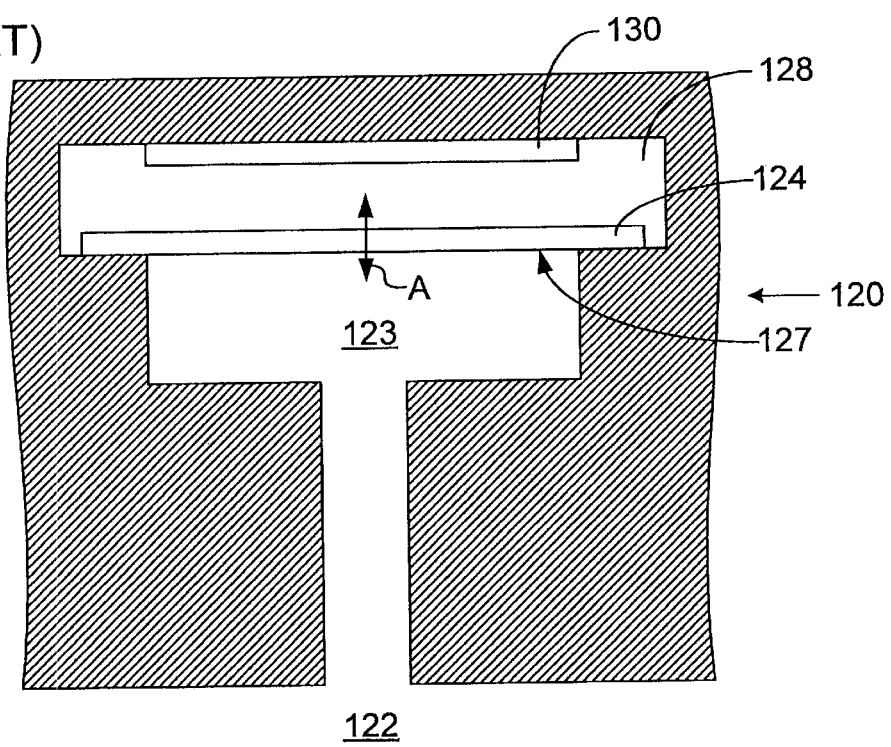
FIG. 1B illustrates a conventional manometer suitable for detecting pressure within a plasma processing chamber.

In the following detailed description of the present invention, numerous specific embodiments are set forth in order to provide a thorough understanding of the invention. However, as will be apparent to those skilled in the art, the present invention may be practiced without these specific details or by using alternate elements or processes. In other instances well known processes, procedures, components, and circuits have not been described in detail so as not to unnecessarily obscure aspects of the present invention.

In accordance with one aspect of the present invention, there is provided a manometer that is resistant to an operational change caused by process chemistry associated with a plasma processing chamber. In accordance with another aspect of the invention, methods are provided for protecting manometers from this change leading to undesirable drift. The resulting manometer is resistant to a chemical change caused by plasma chemistry in the plasma processing chamber. In one embodiment, the manometer includes a diaphragm which is pretreated to resist a chemical change caused by the process (e.g., etch) chemicals used in a plasma processing chamber. In another embodiment, the diaphragm of the manometer is chemically pretreated before the manometer is assembled.

Advantageously, according to the invention, the material properties of the diaphragm (and corresponding sensing ability of the manometer) are maintained without transient effects during the operational lifetime of the manometer. Thus, a manometer is provided whose chemical sensitivity to process chemistry is very much reduced as compared to conventional manometers. Thus, the invention enables sufficiently accurate and repeatable control of a plasma pressure chamber to allow fabrication of modern semiconductor-based devices without compromise due to the operational degradation of the diaphragm.

Manometer drift has been discovered to occur as a result of a change of the pressure sensitive diaphragm within a manometer. This change of the pressure sensitive diaphragm is the attack of process (e.g., etch) chemistry, occurring within the plasma processing chamber, on a surface of the pressure sensitive diaphragm which is exposed to the process chemistry. Correspondingly, this attack may alter the physical properties of at least one surface of the pressure sensitive diaphragm. As a result, the operational performance of the pressure sensitive diaphragm, and associated manometer, becomes transient and unreliable. For example, unacceptable zero point drift, or non-zero readings of the manometer for zero pressure in the plasma processing chamber, can commonly occur as a result of this change to the pressure sensitive diaphragm. For example, manometers responsible for pressure detection in the range of 0–20 mTorr range have been found to significantly degrade with repetitive exposure to process conditions of plasma processing chambers. One type of change that may occur as a result of attack by process chemistry is known as passivation, in which the diaphragm surface reactive sites sensitive to process chemistry are substantially occupied.

Figure 2A:
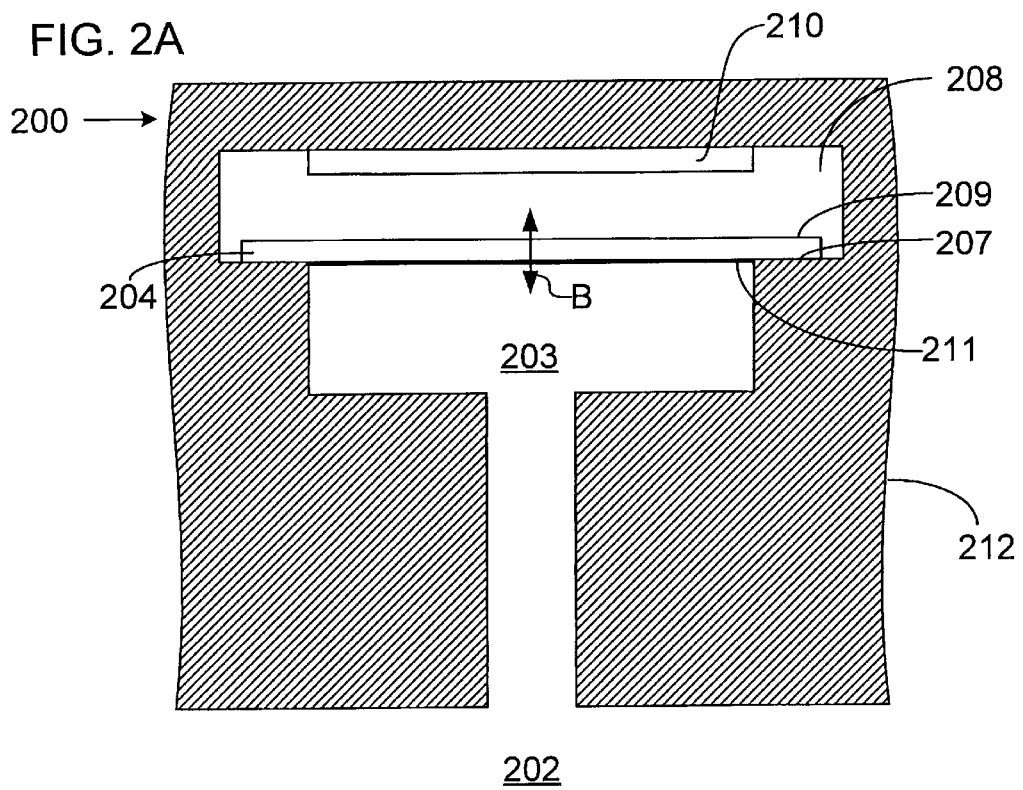
FIG. 2A illustrates a manometer in which a surface of a diaphragm is externally treated to resist chemical change according to one embodiment of the present invention.

FIG. 2A illustrates a manometer 200 in accordance with one embodiment of the present invention. The manometer 200 is suitable for measuring the pressure within a plasma processing chamber within a limited pressure range. For example, the manometer 200 may operate from 0 to 20 mTorr. Of course, a variety of pressure ranges and resolutions may be implemented using manometer 200. The manometer 200 is directly or indirectly coupled to the plasma processing chamber through an inlet area 202. The inlet area 202 may either represent a plasma processing chamber or a portion of a manometer tree.

Manometer 200 includes a pressure sensitive diaphragm 204 which is capable of monitoring the pressure within ambient area 203. The ambient area 203 lies within the manometer 200 and operates at similar environmental conditions as the inlet area 202. The manometer 200 also includes a fixed rigid plate 210. The pressure sensitive diaphragm 204 and the fixed rigid plate 210 together form a capacitive element. A capacitive medium is provided between the pressure sensitive diaphragm 204 and the fixed rigid plate 210. In one embodiment, the capacitive medium is a vacuum which is sealed within an area 208. The pressure sensitive diaphragm 204 is sufficiently mechanically and vertically flexible (in the direction indicated by arrow B in FIG. 2A) so that pressure change in ambient area 203 can be adequately transformed into accurate electrical representation of a measured pressure.

In this embodiment, the pressure sensitive diaphragm 204 includes a protection layer 211 which is capable of resisting a change caused by processing performed in the plasma processing chamber. Being resistant to this change is defined to mean that the material (e.g., diaphragm) is not significantly further altered when subjected to further process chemistry. More specifically, the external protection layer 211 is resistant to a change caused by, or associated with, etch or other process chemicals found in ambient area 203. The surface 207 of the pressure sensitive diaphragm 204 is chemically pretreated to form the protection layer 211 thereon. In other embodiments, the protection layer 211 may at least partially, or even fully, penetrate the surface 207.

As process chemistry from the plasma processing chamber proceeds through inlet area 202 into ambient area 203, it is capable of attacking any surface of the pressure sensitive diaphragm 204 it contacts. Since alternate surfaces of the pressure sensitive diaphragm 204, such as surface 209, for example, may not be exposed to the process chemistry, it may not be necessary to protect all surfaces of the pressure sensitive diaphragm 204. Typically, a housing 212, which supports the manometer components, and the pressure sensitive diaphragm 204 combine to seal area 208 and thus protect alternate surfaces of the pressure sensitive diaphragm 204 from exposure to the process chemistry.

The protection layer 211 can be provided in a variety of different ways. For example, the protection layer 211 that renders the diaphragm 204, and thus the manometer 200, resistant to a change to its surface can be provided by pretreating the diaphragm 204 with a passivation process. The passivation process operates to provide sufficient chemical change to a diaphragm in an accelerated manner, so that the resulting diaphragm is resistant to further change caused by a process plasma and thus allowing the associated manometer to be largely immune from drift problems during its operational lifetime. Alternatively, the protection layer 211 may be comprised of any such chemistry or material that renders the surface 207 of the diaphragm 204 resistant to a further change in its physical properties.

It has been found that the change and transient degradation of the pressure sensitive diaphragm 204 has a finite limit. Thus, in one embodiment, the protection layer 211 can be obtained by pretreating the pressure sensitive diaphragm 204 to render the surface resistant to further change, which occurs when the pressure sensitive diaphragm reaches passivation saturation. In other words, pretreatment may persist until pressure sensing transient effects caused by a surface change in the diaphragm cease or are substantially eliminated. At this point, the manometer (and thus the pressure sensitive diaphragm 204) may be calibrated before used to measure pressure in a plasma processing chamber if necessary. As specific applications and processes may include a wide variety of specific chemicals and chemical compounds, the particular chemistry used in the passivation saturation pretreatment of protection layer 211 can also vary considerably.

In one embodiment of the present invention, etch chemicals and aggressive chemistry expected to be used in processes for the plasma processing chamber may be implemented in the pretreatment of the pressure sensitive diaphragm 204. For example, a plasma containing any conventional freons may be used to sufficiently pretreat the diaphragm 204. Pretreatment may persist until transient performance of the manometer ceases. For example, for a diaphragm of Inconel, pretreatment can be carried out by indirect exposure using $O_2$ plasma, operating at an oxygen pressure of 100 mTorr with 200 sccm of flow at an average microwave power of 1000 W, repeated until the plasma exposure time of the diaphragm 204 is in the order of 50 hours.

The pretreatment of the pressure sensitive diaphragm 204 may also be affected by a number of factors other than the process chemistry of the plasma processing chamber. Factors affecting pretreatment may include the pressure sensitive diaphragm 204 material, or may include the operational conditions the manometer 200 may be expected to perform under such as the maximum process temperature, various input plasma power levels, etc. Further, in order to facilitate pretreatment, a variety of ion energies and processes may be additionally implemented. For example, radio frequency (RF) or microwave frequency (MF) plasma generation may be implemented to expedite or accelerate pretreatment. If a plasma is implemented during pretreatment, the flow rate of the gases and the pressure may be varied accordingly to facilitate pretreatment. Alternately, a pretreatment agent may be added in order to expedite, catalyze or facilitate pretreatment. As the wide possible combinations of diaphragm material and etch chemistry may vary rather dramatically, the pretreatment agent may correspondingly vary.

Alternatively, as previously noted, the protection layer 211 can be comprised of any such chemistry or material that renders the surface 207 of the diaphragm 204 resistant to further change. As specific applications and processes may include a wide variety of specific chemicals and chemical compounds under operational conditions of a plasma processing chamber, the precise composition of the protection layer 211 may thus vary considerably. For example, process chemistry used in the plasma processing chamber may include conventional freons such as $CH_2F_2$, $C_2HF_5$, $CHF_3$, $C_2F_6$ or $C_4F_8$ as well as oxygen mainly found during ash steps in the plasma processing chamber. The protection layer 211 may be comprised of a chemically added substance deposited onto the surface which yields appropriate chemical resistance alone or in conjunction with the diaphragm material. Alternately, an overlying film comprised of a suitable chemistry or material may act as the protection layer 211 to protect the pressure sensitive diaphragm 204.

Figure 2B:
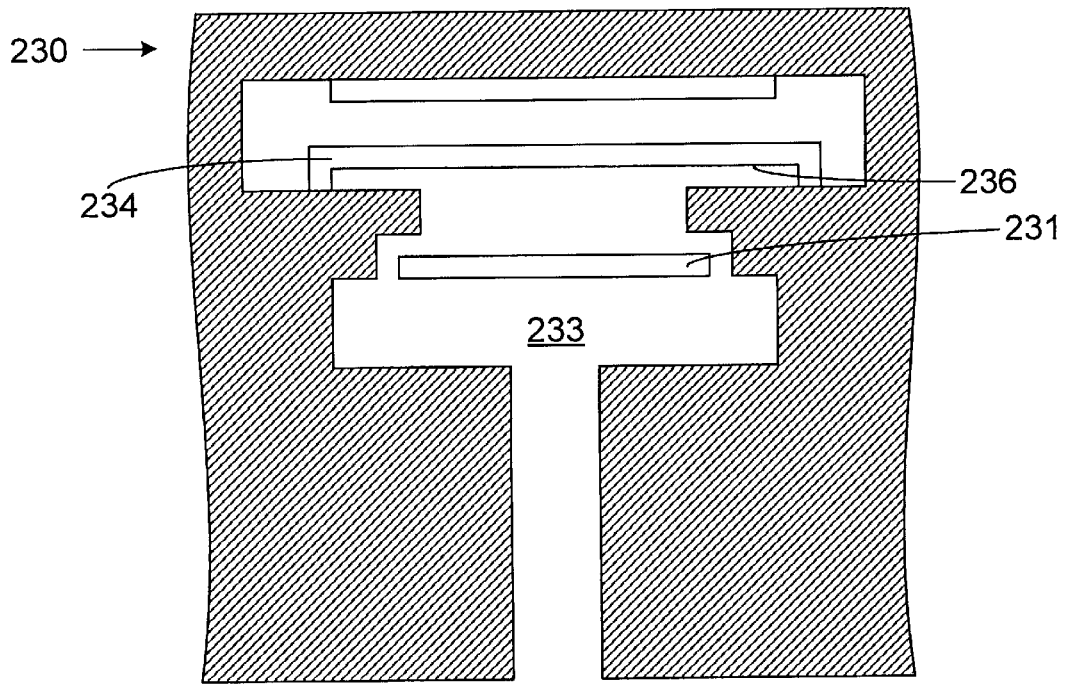
FIG. 2B illustrates a manometer in which the treatment of the diaphragm penetrates the surface to resist chemical change according to another embodiment of the invention.

FIG. 2B illustrates another embodiment of the present invention in which an alternate process chemistry resistant pressure sensitive diaphragm 234 is used for manometer 230. The protection layer in this case penetrates the surface of pressure sensitive diaphragm 234 and is embedded therewithin. Additionally, in this embodiment, the protection layer extends over all surfaces.

The manometer 230 also includes a baffle 231 which is used to reduce direct exposure of the pressure sensitive diaphragm 234 to the process chemistry from an inlet area 232. As etch chemistry from the plasma processing chamber proceeds through the inlet 232 into the ambient area 233 and finally upon the surface 236 of pressure sensitive diaphragm 234, the baffle 231 may aid in restricting direct flow of ions and neutral species produced in a plasma onto the surface 236. Although the baffle 231 is capable of reducing direct flow onto the pressure sensitive diaphragm 234, the process chemistry is still capable of flowing around the baffle 231 and eventually reaching the surface 236 of the diaphragm 234. In other words, the baffle 231 does not prevent degradation of the surface 236 of the pressure sensitive diaphragm 234.

Figure 3:
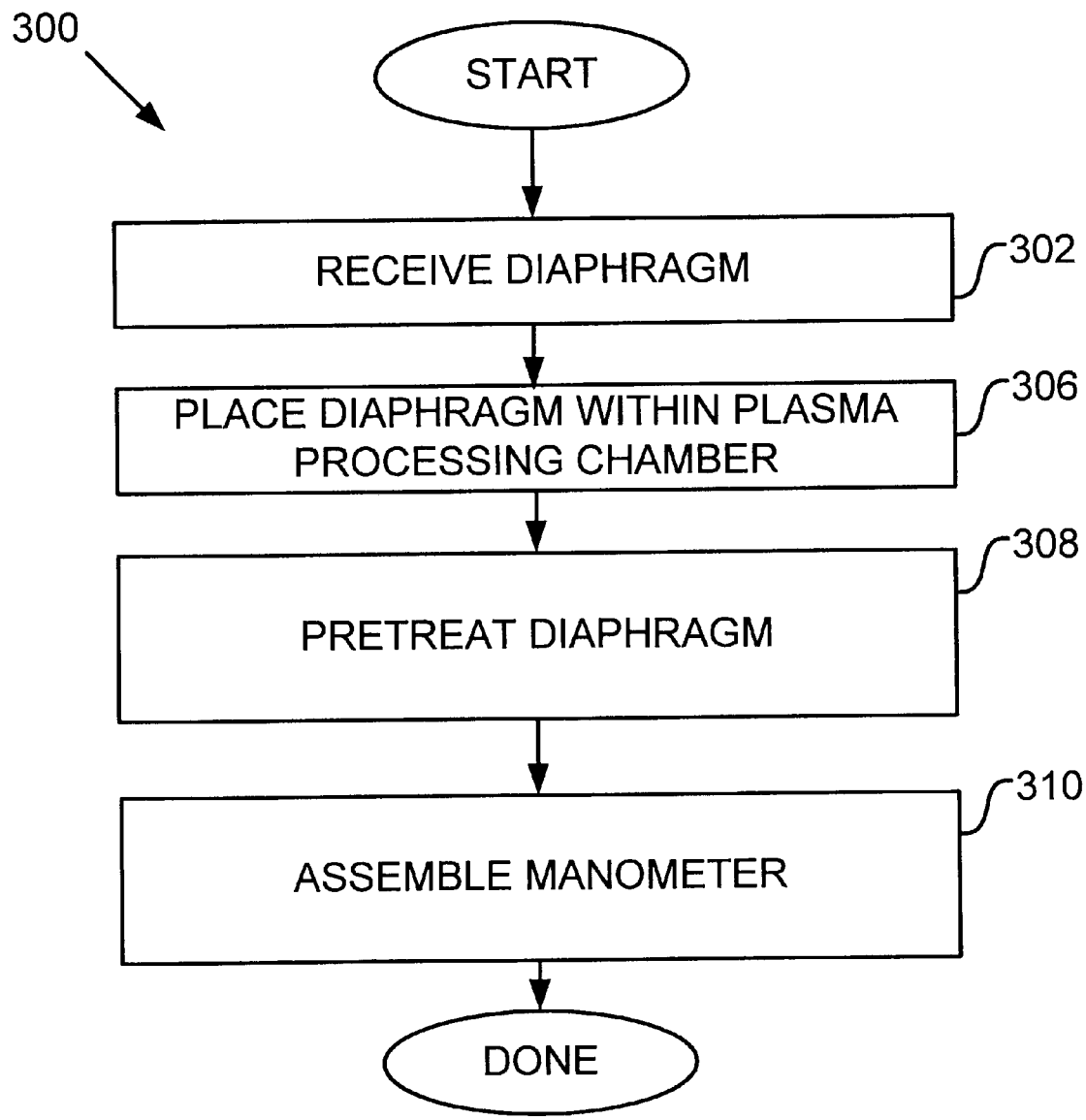
FIG. 3 is a flowchart representing the pretreatment of a diaphragm according to one embodiment of the invention.

The pretreatment of a pressure sensitive diaphragm according to a specific embodiment of the invention will now be described with reference to flowchart 300 of FIG. 3. Pretreatment subjects a pressure sensitive diaphragm to passivation. In the case where pretreatment will occur within a plasma processing chamber, preparing the pressure sensitive diaphragm may include exposing the surfaces which will be subject to process chemistry attack under normal operation. Initially, the pressure sensitive diaphragm to be pretreated is received (step 302). The diaphragm is then placed (306) within a plasma processing chamber, or suitable apparatus, which is capable of passivating the pressure sensitive diaphragm. Once placed within the plasma processing chamber, the pressure sensitive diaphragm is pretreated (308) by exposure to the process chemistry. The process parameters include plasma power, gas flow, pressure, plasma chemistry, treatment time and temperature. Any of the parameters may be varied widely to accomplish this task, as one skilled in the art will appreciate. In one embodiment, the duration of exposure is sufficient to stabilize the manometer performance such that passivation occurs and drift substantially ceases. After pretreatment, the diaphragm may be assembled (310) into the manometer.

The present invention was made possible due to the discovery that a change of the manometer diaphragm by process (e.g., etch) chemistry used in the plasma processing chamber leads to operational degradation. More specifically, semiconductor-based device fabrication and miniaturization requiring a plasma processing chamber tolerance of less than one tenth of a mTorr has only recently become necessitated. Although changes of the diaphragm may have previously occurred, as discovered, the changes of the diaphragm surface relative to these tightened tolerances have made drift very problematic.

Although only a few embodiments of the present invention have been described in detail, it should be understood that the present invention may be embodied in many other specific forms without departing from the spirit or scope of the invention. Particularly, although the invention has been described primarily in the context of a resistant layer additionally added to the diaphragm, the advantages of the present invention are equally attainable using alternate diaphragm materials which are inherently resistant. Alternately, as opposed to pretreating the diaphragm in a plasma processing chamber before manometer assembly, the entire manometer structure may be coupled to or placed within the plasma processing chamber and pretreated as above. Additionally, the passivating layer is not limited to pretreatment of the diaphragm surface. It should be understood that a passivating resistant chemical coating may be added to the diaphragm surface to provide protection from plasma exposure and chemical alterations. Therefore, the present examples are to be considered as illustrative and not restrictive, and the invention is not to be limited to the details given herein, but may be modified within the scope of the appended claims.

What is claimed is:

1. A manometer for use in a plasma processing system, said manometer comprising:
    a housing in gaseous communication with the plasma processing chamber;
    a rigid plate attached to the housing; and
    a pressure sensitive diaphragm attached to the housing, the pressure sensitive diaphragm sealing a portion of the housing in which the rigid plate is isolated from gaseous communication with the plasma processing chamber, wherein at least a portion of the pressure sensitive diaphragm is pretreated to resist chemical change over the operational lifetime of the manometer.

2. A manometer as recited in claim 1 wherein the pressure sensitive diaphragm is substantially resistant to chemical change from chemicals used within the plasma processing chamber.

3. A manometer as recited in claim 2 wherein the pressure sensitive diaphragm is chemically pretreated through the use of process chemistry used within the plasma processing chamber.

4. A manometer as recited in claim 1 wherein the manometer operates in the range of 0–100 mTorr.

5. A manometer as recited in claim 1 wherein the manometer operates in the range of 0–20 mTorr.

6. A manometer as recited in claim 1 wherein the pressure sensitive diaphragm is comprised of Inconel.

7. A manometer as recited in claim 1 wherein the portion of the pressure sensitive diaphragm resistant to chemical change is chemically different than the remainder of the diaphragm.

8. The manometer as recited in claim 1 wherein the rigid plate and the pressure sensitive diaphragm comprise opposing plates of a capacitor used to provide a pressure measurement.

9. A manometer as recited in claim 1 further including at least one baffle.

10. A manometer as recited in claim 1 wherein the housing is sealed.

11. A manometer as recited in claim 1 wherein the pressure sensitive diaphragm is consistently substantially resistant to manometer drift over the operational lifetime of the manometer.

12. A manometer as recited in claim 11 wherein the pressure sensitive diaphragm is consistently substantially resistant to zero-point manometer drift over the operational lifetime of the manometer.

13. A manometer as recited in claim 1 wherein the pressure sensitive diaphragm surface reactive sites sensitive to process chemistry used in the plasma processing chamber are substantially occupied over the operational lifetime of the manometer.

14. A semiconductor fabrication apparatus comprising:
    a plasma processing chamber capable of administering a semiconductor fabrication process; and
    at least one manometer coupled to the plasma processing chamber including a pressure sensitive diaphragm pretreated to resist chemical change associated with process chemistry used within the plasma processing chamber over the operational life of the manometer.

15. A semiconductor fabrication apparatus as recited in claim 14 wherein the semiconductor fabrication apparatus is a semiconductor etch machine.

16. A semiconductor fabrication apparatus as recited in claim 14 wherein said at least one manometer is pretreated using process chemistry used within the plasma processing chamber.

17. A semiconductor fabrication apparatus as recited in claim 14 wherein the pressure sensitive diaphragm is consistently substantially resistant to drift over the operational lifetime of the at least one manometer.

18. A semiconductor fabrication apparatus as recited in claim 14 wherein at least one surface of the pressure sensitive diaphragm comprises reactive sites sensitive to process chemistry used in the plasma processing chamber that are substantially occupied over the operational lifetime of the at least one manometer.

* * * * *